May 18, 1965 M. F. GRAHL ET AL 3,184,688
TEMPERATURE COMPENSATED AMPLIFIER
Filed July 13, 1961
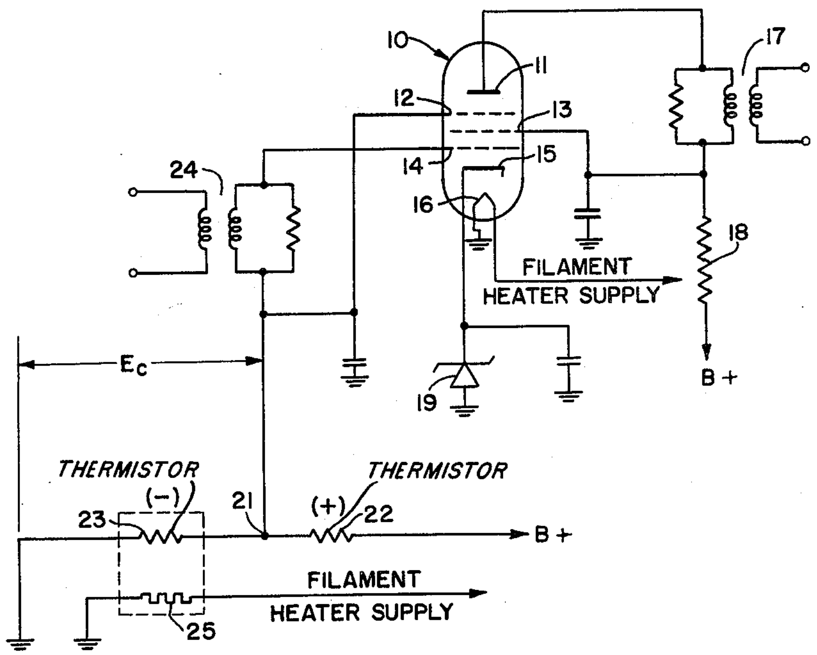
INVENTORS.
MELVIN F. GRAHL
KEEFER S. STULL, JR.
BY W. O. Quesenberry
D. L. Hodges
ATTYS.

United States Patent Office 3,184,688
Patented May 18, 1965

3,184,688

TEMPERATURE COMPENSATED AMPLIFIER

Melvin F. Grahl and Keefer S. Stull, Jr., Baltimore, Md., assignors, by mesne assignments, to the United States of America as represented by the Secretary of the Navy Filed July 13, 1961, Ser. No. 123,912
2 Claims. (Cl. 330—136)

This invention relates to a receiver or an amplifier system and more particularly to a receiver or amplifier system in which the gain varies excessively with changes in the heater voltage of the tubes or with changes in ambient temperature.

In the field of I.F. amplifiers it has been the general practice to obtain the control grid bias from a potential divider connected across a direct current voltage source such, for example, as the B+ supply voltage. In systems unexposed to large variations in ambient temperature and in which the heater supply voltage is closely controlled, such a system has been quite satisfactory. Although such systems have served the purpose under such controlled conditions, they have not proved entirely satisfactory under conditions of large ambient temperature changes, or in systems where for some reason the heater supply voltage cannot be closely controlled.

The general purpose of the invention, therefore, is to provide a receiver or amplifier system which embraces all of the advantages of similarly employed prior art devices and possesses none of the aforedescribed disadvantages. The present invention contemplates a pair of thermistors, connected as a voltage divider across the B+ supply, one thermistor being exposed to ambient temperature and the other being exposed to a heater connected to the tube heater supply voltage. In this manner a stabilizing circuit is provided to compensate for gain variation due to the above described variations.

An object of the invention, therefore, is to provide an amplifier, the gain of which is unaffected by changes in ambient temperature.

Another object is to provide an amplifier in which changes in heater supply voltage do not affect the amplifier gain.

Still another object is the provision of a receiver or amplifier system which is stabilized against variations in gain due to changes in ambient temperature and heater supply voltage.

Other objects and many of the attendant advantages of this invention will be more readily appreciated as the same becomes better understood by reference to the following detailed description when considered in connection with the accompanying drawing in which:

The single figure illustrates an I.F. amplifier circuit embodying the present invention.

In the conventional pentode amplifier the mid-frequency gain of the tube is approximately equal to ($-g_m R_{ac}$) where $g_m$ is the mutual conductance or transconductance and $R_{ac}$ is the load or plate-circuit impedance to alternating current. The transconductance is given by the expression $$g_m = \left[\frac{\Delta i_b}{\Delta e_c}\right] e_b = \text{constant}$$

where $\Delta i_b$ is the change in plate current, $\Delta e_c$ is the change in control grid bias and $e_b$ is the plate voltage. The transconductance may therefore be determined from a family of $i_b$ vs. $e_b$ pentode curves.

It will be readily apparent to those skilled in the art that as the ambient temperature or heater supply voltage increases, the plate current of the pentode will also increase for any fixed control bias and plate voltage. It will also be readily apparent that this current increase will not be the same for each control bias voltage but rather, will be proportionally larger for less negative control bias voltages than for higher negative bias voltages. That is to say, that the increase in plate current due to increase ambient temperature or heater voltage will be larger at a control bias of $-0.5^v$, for example, than it will be at a control bias of $-2.0^v$.

Since the transconductance of the pentode is given by the change in plate current divided by the change in control grid bias and since as hereinbefore explained, the plate current for a less negative bias will be proportionally greater for a given increase in cathode temperature than for a greater negative bias, it is readily apparent that if the cathode temperature increases, $\Delta i_b$ will increase for a given $\Delta e_c$. Therefore, the transconductance increases giving a resulting increase in the gain of the system.

To stabilize the system it is therefore necessary to decrease the control grid bias and thereby reduce the change in plate current $\Delta i_b$ for any given change in grid bias $\Delta e_c$ to the original desired value.

Such a result is accomplished by selecting the characteristics of the thermistor voltage divider such that a change in ambient temperature or a change in heater voltage will change the resistance thereof to lower the control grid bias sufficiently to maintain the gain of the system constant.

Referring now to the drawing, there is illustrated, by way of example only, a single stage of an I.F. amplifier embodying the instant invention. There is illustrated a pentode amplifier, generally indicated as 10, having an anode 11, a suppressor grid 12, a screen grid 13, a control grid 14, a cathode 15, and a filament heater 16. Anode 11 is connected through an I.F. coupling transformer 17 and resistor 18 to the positive terminal of the power supply. Cathode 15 is connected to ground through a Zener diode 19 which holds the cathode voltage at the desired operating level and allows the full variation of grid voltage without any degeneration as a result of a change in cathode voltage.

The direct current control grid bias $E_c$ is provided at point 21 by a potential divider comprising thermistors 22 and 23 connected across a suitable source of potential, such for example as the power supply illustrated. Control grid 14 is connected to the potential divider intermediate point 21 through the I.F. coupling transformer 24.

Thermistor 22 has a positive temperature coefficient of resistance and is exposed to the ambient temperature while thermistor 23 has a negative temperature coefficient and a built-in heater device 25. Heater 25 is connected across the filament heater supply.

It is readily apparent that as the plate current increases due to an increase in ambient temperature, the resistance of thermistor 22 will increase thereby decreasing the potential at point 21 and stabilizing the gain of the amplifier. Likewise, if the heater supply voltage increases, the resistance of thermistor 23 decreases thereby also decreasing the potential at point 21. Of course, the converse is true for relative decreases in ambient temperature and heater supply voltage.

Since thermistor 23 is also affected by ambient temperature changes, by a proper selection of its characteristics the circuit can be compensated for changes in amplifier gain due to both ambient temperature and heater supply changes. In such a circuit, thermistor 22 would be replaced by a resistance having a zero temperature coefficient.

There has been illustrated and described a compensating circuit for a receiver or amplifier system in which the gain of the system is stabilized against changes due to variations in ambient temperature and/or variations in filament heater supply voltage which are small and in which the compensating circuit is readily adapted to any system requiring such stabilization.

Reference to a single stage I.F. amplifier is made by way of example only and it should be understood, that the foregoing disclosure relates not only to the preferred embodiment illustrated but also to any system wherein the gain is to be stabilized against temperature and filament voltage variations and that numerous modifications or alterations may be made therein without departing from the spirit and the scope of the invention as set forth in the appended claims.

What is claimed as new and desired to be secured by Letters Patent of the United States is:

1. A single stage, temperature compensated, intermediate-frequency amplifier comprising a power supply, a pentode amplifier having an anode, a cathode, a control grid and a filament, an output coupling transformer connected to said anode and said power supply, a source of constant potential connected to said power supply, said cathode being connected to said source of constant potential, a first resistor and a second resistor connected in series across said power supply, said first resistor having a positive temperature coefficient of resistance, said second resistor having a negative temperature coefficient of resistance, an input coupling transformer connected to said control grid and to a point intermediate said first and said second resistors, a source of filament voltage connected to said filament, and a heater connetced across said source of filament voltage, said heater being in thermal conductive relationship with said second resistor, whereby the gain of said pentode amplifier is stabilized during variations in temperature of said first resistor and said second resistor.

2. Apparatus as recited in claim 1 wherein said source of constant potential comprises a Zener diode having its cathode connected to said cathode and its anode connected to ground.

References Cited by the Examiner

UNITED STATES PATENTS

| | | | |
|---|---|---|---|
| 2,468,082 | 4/49 | Chatterjea et al. | 330—143 X |
| 2,854,606 | 9/58 | Spiegel | 330—143 X |

FOREIGN PATENTS

| | | |
|---|---|---|
| 131,275 | 6/46 | Australia. |

OTHER REFERENCES

Happell, G. E. and Hesselberth, W. M.: Engineering Electronics, McGraw-Hill, N.Y., 1953, pages 120–125 relied upon.

Radio-Electronics, February 1961, article by D. L. Stoner, "Do It With Diodes," pages 38–40.

ROY LAKE, *Primary Examiner.*

NATHAN KAUFMAN, *Examiner.*